United States Patent

Messman

[15] 3,647,416
[45] Mar. 7, 1972

[54] SLOW-RELEASE FERTILIZER SPIKE HAVING HIGH CRUSH-RESISTANCE

[72] Inventor: Henry C. Messman, Mamaroneck, N.Y.

[73] Assignee: Edmond L. d'Ouville, Evergreen Park, Ill. a part interest

[22] Filed: July 18, 1969

[21] Appl. No.: 842,946

[52] U.S. Cl. ................................................. 71/29, 71/64 A
[51] Int. Cl. ....................................................... C05c 9/02
[58] Field of Search ......................... 71/29, 64 A, 64 F, 64 R

[56] References Cited

UNITED STATES PATENTS

| | | | |
|---|---|---|---|
| 1,953,419 | 4/1934 | MacIntire | 71/34 X |
| 2,032,608 | 3/1936 | Antrim | 71/64 A X |
| 3,024,098 | 3/1962 | Austin et al. | 71/29 |
| 3,057,713 | 10/1962 | Gessler | 71/64 A |
| 3,062,637 | 11/1962 | Marples et al. | 71/64 G X |
| 3,502,458 | 3/1970 | Schenk | 71/64 |

OTHER PUBLICATIONS

Hackh' s Chemical Dictionary, Third Edition, page 78, published by McGraw- Hill Co., Inc., New York, 1944.

*Primary Examiner*—Reuben Friedman
*Assistant Examiner*—Bennett H. Levenson
*Attorney*—Philip Hill

[57] ABSTRACT

A slow-release fertilizer composition, having a crushing strength in excess of 2,000 p.s.i., comprises a water-soluble urea-formaldehyde resin, a granular filler material and a binder derived from magnesia and phosphoric acid. The composition is prepared as a paste and extruded in the form of a beveled spike.

4 Claims, 4 Drawing Figures

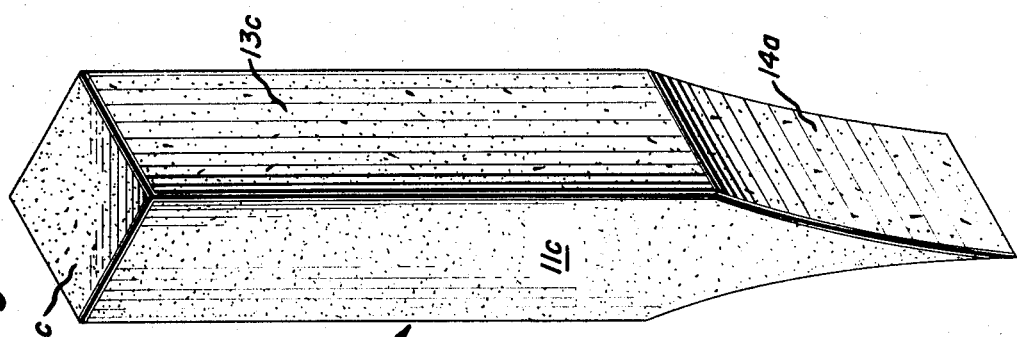
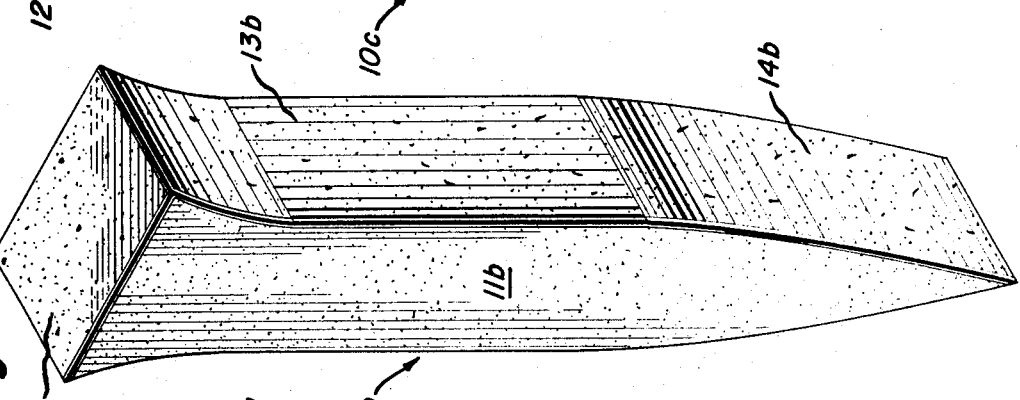
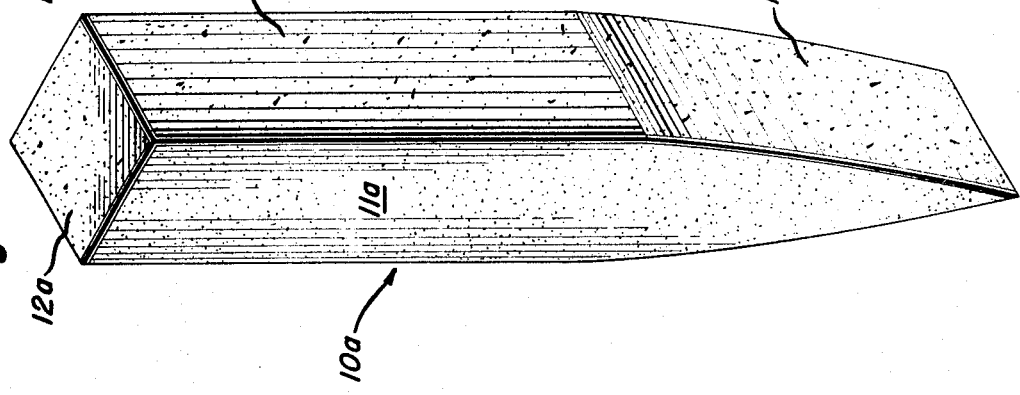
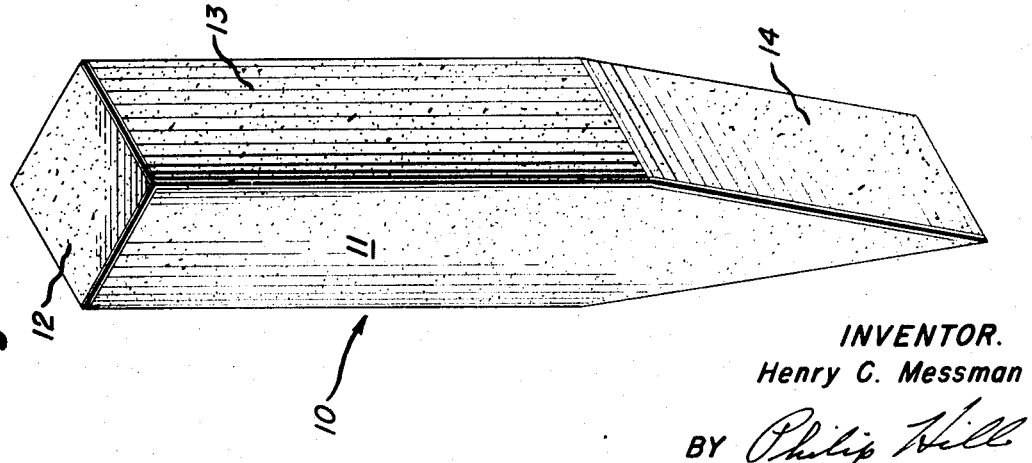

SLOW-RELEASE FERTILIZER SPIKE HAVING HIGH CRUSH-RESISTANCE

BACKGROUND OF THE INVENTION

This invention relates to compositions suitable for crush-resistant, shaped solids useful as slow-release fertilizers for ornamental trees and shrubs, to the configuration of the shaped solids and to their method of formation.

To stimulate the growth of ornamental trees and shrubs and the like, it is desirable to apply a slow-release fertilizer without materially disturbing or disfiguring the surrounding sod or lawn, or burning the lawn by overfertilization. It is conventional to make small-dimaeter core holes in the sod or soil surrounding the trees or shrubs and fill the holes with powdered fertilizer or liquid fertilizer concentrates. This procedure, while effective, is cumbersome and inconvenient and requires special equipment.

An alternate solution to this problem is disclosed by A. E. Gessler in U.S. Pat. No. 3,057,713 whereby nutrients are made available to root systems by insertion of fertilizer sticks into the soil. These sticks are molded in pointed shapes having a hardened exterior suitable for hammering into the ground when fitted with a protective cap.

There remain the problems of providing both inexpensive, slow-release, uniform combinations of fertilizer nutrients and a simple, convenient method of preparing the combinations in a readily usable form.

SUMMARY OF THE INVENTION

This invention is a novel crush-resistant composition of fertilizer nutrients together with filler and binder materials, fashioned in the form of a tapered spike, preferably by an extrusion process.

It is the object of this invention to provide crush-resistant, shaped solids of a slow-release fertilizer which can be force or driven into the soil or lawn at spaced points without materially disturbing or disfiguring the surface. By crush-resistant is meant solid compositions having a crushing strength of at least about 2,000 p.s.i. when measured by ASTM method C-39-66.

Various geometric shapes such as beveled rods, cylinder, prisms, spheroids, and pyramids having a crushing strength in excess of 2,000 p.s.i. can be formed or driven into most sods directly, without the use of protective caps and without the necessity of coring the sod or soil. I have discovered a novel composition which is a balanced slow-release fertilizer and, when properly cast or extruded and air-cured, has the required high crushing strength. The crushing strength of my composition is comparable to concrete, exceeding 2,000 p.s.i. and often attaining a crushing strength in excess of 2,500 to 3,000 p.s.i.

My novel crush-resistant slow-release fertilizer composition comprises a water-soluble urea-formaldehyde resin, a granular filler material and a binder cement derived from the reaction of magnesia with a substantially stoichiometric quantity of aqueous phosphoric acid. To this composition may be added potassium compounds and minor quantities of fertilizer trace-element compounds to provide balanced plant nutrition.

DETAILED DESCRIPTION OF THE INVENTION

The essential components of this novel composition are a urea-formaldehyde resin, a granular filler and a binder cement.

The urea-formaldehyde (ureaform) resin must be capable of slowly releasing nitrogen to he soil in an available form by dissolution in water. Accordingly the choice of resin is limited to the water-soluble urea-formaldehyde resins. These water-soluble resins have high nitrogen contents, generally in the range from 35 to 40 weight percent. A particularly suitable ureaform material, sold by Du Pont under the trade name "U-ramite," contains 38 percent nitrogen. This ureaform has a measurable but low water solubility. In addition to providing nitrogen values it acts as a binder and as a controlled waterproofing agent.

The filler material should be ground and/or screened to provide a uniform mass of 16- to 20-mesh granules. Suitable granular filler materials include petroleum coke, sand, clays, expanded clays, and coke breeze derived from coal. A unique and desirable component is finely divided petroleum coke. So-called "fluid coke" from a conventional fluid coker may be directly employed. Coke breeze may also be employed without further treatment. Petroleum is an igneous material and petroleum coke is a thermal residue of petroleum, rich in vanadium and nickel as well as other trace metals present in vegetable matter. It also contains both free and combined sulfur. The coke serves as an aggregate or filler and has the advantage of low density when compared to sand or clays. Coke from a delayed coker, calcined and ground and/or screened to 16- to 20-mesh size, is likewise suitable and can be employed.

The binder cement is derived from the reaction of magnesia with aqueous phosphoric acid. Magnesia is readily obtained as calcined magnesite. The phosphoric acid is preferably about 50 percent aqueous $H_3PO_4$. The amount introduced should be sufficient to react with the magnesite to form a magnesium phosphate binder or cement. The composition of the binder is believed to be "Newberyite" cement corresponding to $MgHPO_4 \cdot 3H_2O$ or a form of magnesium oxyphosphate, for example $MgO \cdot MgH_4(PO_4)_2$. It is not essential that the magnesium oxide and phosphoric acid be in the exact stoichiometric ratio. Either the phosphoric acid or magnesium oxide may be present in moderate excess. Part of the phosphate required may be supplied by the addition of salts such as diammonium phosphate. Proper selection of the proportions of these binder components is a major factor in achieving the extraordinary crushing strengths of these novel compositions.

Other components may be included in this novel composition to achieve desirable balances of fertilizer nutrients. Potassium is a major fertilizer nutrient and is preferably introduced as a salt; for example, potassium chloride. Fertilizer trace elements may be added in the form of salts (e.g., chloride or sulfate) of metals such as boron, iron, manganese, molybdenum, nickel, vanadium and zinc, a desirable range being about 0.1 to 2.0 weight percent.

Proportions of components of this novel composition, suitable to provide both slow-release fertilization and high crush-resistance, may be selected from within the following ranges, expressed as parts by weight:

30 to 50 parts urea-formaldehyde resin,
10 to 30 parts granular filler,
10 to 30 parts binder cement,
0 to 10 parts potassium salt, calculated as potassium oxide, and
0 to 2 parts fertilizer trace elements.

The novel compositions of my invention can be fashioned into a tapered spike, for forcing into the soil, by any technique known to one skilled in the art. Prior art production methods for such shaped solids generally suggest the mixing together of the components to obtain a moldable paste or dough, forming the spikes in molds, and finally drying and finishing, the latter operation being conducted at elevated temperatures.

The formation of the shaped solids by extrusion is preferred to molding because it is more economical and lends itself better to mass production, Although pointed shaped cannot be made by extrusion technique employing a vertical cutoff, beveled shapes can be so made (by extrusion with vertical cutoff) and these shapes are as easily forced into the soil as the pointed shapes. With high crushing strength they can be forced into the soil without fracture.

Although pointed elongated shapes such as those proposed in U.S. Pat. No. 3,057,713 can be forced into soft soils when protected by a rubber cap, I prefer shaped solids which can be formed by extrusion and perpendicular cutting and which have a high crushing strength. Such shaped solids are particularly exemplified by the embodiments shown in the attached drawing. FIG. 1 is a perspective drawing of the preferred embodiment of the fertilizer spike. FIGS. 2, 3 and 4 are perspective drawings of other suitable embodiments.

Referring particularly to FIG. 1, a preferred shape consists of a rectangular or square top 12, a planar face 11 extending the full length of the spike 10, an upper face 13 depending from top 12 and normal to face 11 and a lower face 14 extending from the bottom edge of 13 to the extremity of the spike as described by 11. The obverse faces corresponding to 11, 13 and 14 are not shown. Among other suitable shapes of the spike are those providing a convex lower face such as 14a in FIG. 2 or a concave lower face such as 14c in FIG. 4 and, optionally, a flared upper face such as 13b in FIG. 3. In general the length described by 11 should be between 4 and 10 inches, preferably between 5 and 8 inches, and the cross-sectional area at the top end 12 should be between 1 and 3 square inches. The total exposed surface on the slanted or beveled face 14 and its obverse face, i.e., the combined surface areas of these faces, should be at least 4 times the rectangular surface on the flat or top end 12. In order to form these shapes by extrusion and perpendicular cutting, a die whose opening has a contour edge configuration typically illustrated by the faces 11, 11a, 11b and 11c is used. These shapes, when formed from compositions with ASTM crushing strengths above 2,000 p.s.i., require no protective caps for general use.

EXAMPLE

The following example is illustrative, without limitation, of the technique employed in fashioning my novel composition into a crush-resistant tapered spike.

The following ingredients were brought together employing the weight proportions shown.

```
45 parts Calcined Magnesite
   (60% Mg)
110 parts 75% Phosphoric Acid
   (54% P₂O₅)
405 parts Ureaform (Du Pont Uramite)
   (38% N)
85 parts Diammonium Phosphate
   (21% N-53% P₂O₅)
130 parts Potassium Chloride
   (62% K₂O)
5 parts Ferric Oxide
20 parts Fertilizer Trace Elements
   (Tennessee Corp.)
200 parts Fluid Coker Petroleum Coke
   (16-20 mesh)
1,000 parts
```

All the ingredients except the petroleum coke and phosphoric acid were dry mixed. The dry mixture was then thoroughly mixed with the phosphoric acid which had been diluted to a strength of about 50 percent. To this pasty mixture was then added the petroleum coke to provide a thick extrudable mix or flux.

The compaction from the volume of the original loose dry mix was about 3 to 1 and from the lightly tamped mix about 2 to 1. The thick paste mixture did not stick to the surfaces of molding or extrusion equipment.

The green strength of the freshly-formed shapes from this formulation was ample for handling and the shapes cured at room temperatures to a strength of about 2,400 p.s.i. in 10 days.

In a preferred method of operation the thick paste mixture of the above example is extruded through a die whose contour edge describes the shape illustrated by face 11 in FIG. 1. The overall length is 7 inches and the maximum width is 1 inch along the upper 4 inches of the shape. The lower 3 inches of the shape are tapered uniformly to describe a tapered spike. As the paste is extruded from the die it is cut into 1-inch thick strips to provide the 3-dimensional shaped spike illustrated in FIG. 1, thus determining the cross-sectional area of the spike, apart from the beveled end portion thereof, wherein the combined areas of the slanted or beveled surfaces (face 14 and its obverse) are greater than 6 square inches and the top cross section rectangular area (face 12) is 1 square inch, with the beveled end portion of the spike manifesting a diminishing cross-sectional area.

The calculated analysis for the ingredients of this example is 17N-10P-K. Trace elements are present in the following amounts:

| | | |
|---|---|---|
| Boron | (B) | 0.02 % |
| Iron | (Fe) | 0.02 % |
| Manganese | (Mn) | 0.06 % |
| Molybdenum | (Mo) | 0.0035 % |
| Nickel | (Ni) | 0.002 % |
| Vanadium | (V) | 0.01 % |
| Zinc | (Zn) | 0.06 % |

One skilled in the art can adjust the specific composition of this example to provide shapes suitable for various soil conditions, provided 30 to 50 percent by weight water-soluble urea-formaldehyde resin and at least 10 percent by weight of each of the filler and the binder cement are present in the hardened product.

I claim:

1. A slow-release fertilizer composition, shaped as a spike having a beveled end portion and having a crushing strength of at least 2,000 p.s.i., comprising
   a. 30–50 weight percent water-soluble urea-formaldehyde resin containing about 35 to 40 weight percent nitrogen;
   b. 5–10 weight percent potassium salts, calculated as potassium oxide;
   c. 10–30 weight percent ground coke; and
   d. 10–30 weight percent of binder cement, derived from the substantially stoichiometric reaction of magnesia with aqueous 50 percent phosphoric acid;
   the top end of the spike, opposite the beveled portion thereof, having a cross-sectional area between about 1 and 3 square inches, said cross-sectional area diminishing along the beveled portion of the spike, the combined areas of the obverse beveled surfaces being at least 4 times the surface area at the said top end of the spike.

2. The composition of claim 1, additionally comprising about 0.1 to 2.0 weight percent fertilizer trace elements.

3. A method for the manufacture of homogeneous, crush-resistant, slow-release fertilizer compositions, shaped in the form of a spike having a beveled end portion and having a crushing strength of at least 2,000 p.s.i., comprising the steps of:
   a. preparing a dry powder mixture comprising, in parts by weight, about 45 parts magnesia, and about 405 parts of a urea-formaldehyde resin containing about 35 to 40 weight percent nitrogen;
   b. converting the dry powder mixture to a uniform paste by agitating the powder mixture with about 110 parts of 75 percent phosphoric acid diluted with sufficient water to reduce the acid strength to about 50 percent;
   c. blending into the paste about 200 parts ground coke;
   d. extruding the blended paste through a die having an opening whose counter edge configuration is shaped to define the length of a spike having a beveled end portion, said length being within the range from 5 to 8 inches, the cross-sectional area of the said spike extrudate along the said beveled end portion diminishing to determine the same;
   e. cutting the shaped spike extrudate of d into strips to define the cross sectional area of the beveled spike at its top end and above the beveled portion thereof, said cross sectional area being at least 1 square inch but no greater than required to provide a top cross-sectional area of the spike of about 3 square inches, the combined surface areas of the obverse beveled faces of the spike being at least 4 times the surface area of the top end; and
   f. drying the extruded spike at ambient temperature for about 10 days, to provide a cured fertilizer composition comprising a spike having a beveled end portion.

4. The method of claim 3 wherein the dry powder mixture additionally comprises about 130 parts of potassium chloride.

* * * * *